United States Patent [19]

Lacroix et al.

[11] 4,309,180
[45] Jan. 5, 1982

[54] ANTHRAQUINONE COMPOUNDS AND THE PRODUCTION AND USE THEREOF

[75] Inventors: Roger Lacroix, Huningue; Jean-Marie Adam, Saint-Louis, both of France; János Vincze, Basel, Switzerland

[73] Assignee: Ciba-Geigy Corporation, Ardsley, N.Y.

[21] Appl. No.: 166,277

[22] Filed: Jul. 1, 1980

Related U.S. Application Data

[63] Continuation of Ser. No. 963,627, Nov. 24, 1978, abandoned.

[30] Foreign Application Priority Data

Nov. 28, 1977 [LU] Luxembourg .......................... 78597

[51] Int. Cl.³ .................... C09B 1/24; C07C 143/665; C09B 1/34; C09B 1/52
[52] U.S. Cl. ........................................ 8/609; 260/372; 8/611; 8/643; 8/436
[58] Field of Search .................... 260/372; 8/643, 609, 8/611, 636

[56] References Cited

U.S. PATENT DOCUMENTS 3,320,287  5/1967  Schwander .................... 260/372

FOREIGN PATENT DOCUMENTS 2335512  1/1976  Fed. Rep. of Germany .

Primary Examiner—Winston A. Douglas
Assistant Examiner—Raymond K. Covington
Attorney, Agent, or Firm—John P. Spitals; Edward McC. Roberts

[57] ABSTRACT

There are described new anthraquinone compounds which, in the form of the free acid, correspond to the formula I

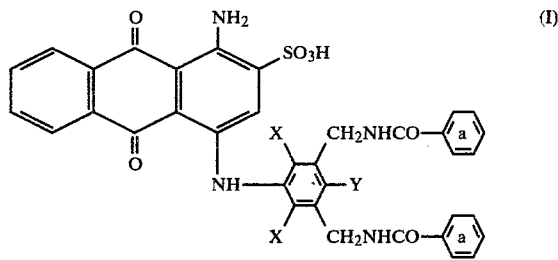

wherein the X's independently of one another are each a straight-chain or branched-chain alkyl group having 1 to 4 carbon atoms, Y is hydrogen or is the same as X, and wherein the phenyl rings a can also be substituted by one or more halogen atoms, the production and use thereof, and also dye solutions containing a solvent mixture consisting of one or more aprotic solvents, at least one glycol and/or glycol ether, and optionally water and further additives, which solutions contain in each case a mixture of two anthraquinone dyes which, in the form of the free acid, correspond to the formulae I and IV

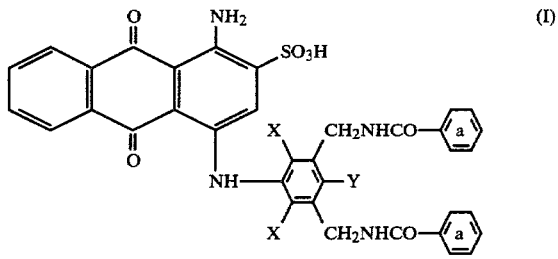

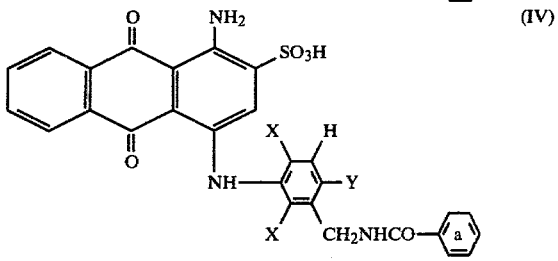

wherein the X's independently of one another are each a straight-chain or branched-chain alkyl group having 1 to 4 carbon atoms, Y is hydrogen or is the same as X, and wherein the phenyl rings a can also be substituted by one or more halogen atoms.

13 Claims, No Drawings

ANTHRAQUINONE COMPOUNDS AND THE PRODUCTION AND USE THEREOF

This is a continuation of application Ser. No. 963,627 filed on Nov. 24, 1978, now abandoned.

The invention relates to new anthraquinone compounds which, in the form of the free acid, correspond to the formula I

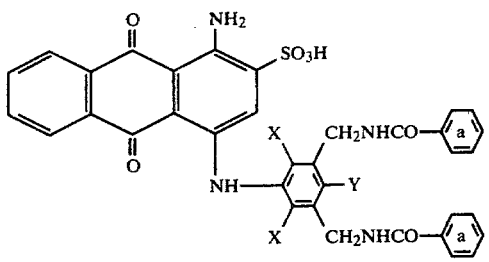

wherein the X's independently of one another are each a straight-chain or branched-chain alkyl group having 1 to 4 carbon atoms, Y is hydrogen or is the same as X, and wherein the phenyl rings a can also be substituted by one or more halogen atoms; to a process for producing these anthraquinone compounds, and also to the use thereof for dyeing and printing materials dyeable with acid dyes, particularly textile materials made from synthetic polyamide or wool; and also to dye mixtures containing an anthraquinone compound of the formula I, and to the production and use of these dye mixtures, for example in the form of solutions for preparing dye baths for dyeing polyamide materials and especially for dyeing leather.

As a straight-chain or branched-chain alkyl group having 1 to 4 carbon atoms, X and Y are each the methyl, ethyl, n- and iso-propyl group or the n-, sec- and tert-butyl group. In preferred anthraquinone compounds, Y is the same as X; in particular X and Y are each the same straight-chain alkyl group having 1 to 4 carbon atoms, especially the methyl group.

If the phenyl rings a are also substituted by one or more halogen atoms, these are fluorine, chlorine or bromine. In preferred anthraquinone compounds, the phenyl rings a are not substituted.

The new anthraquinone compounds of the formula I are obtained by reacting an anthraquinone compound which, in the form of the free acid, corresponds to the formula II

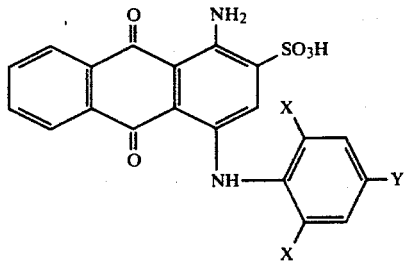

wherein X and Y have the meanings defined, with at least 2 equivalents of an N-methylolbenzamide of the formula III

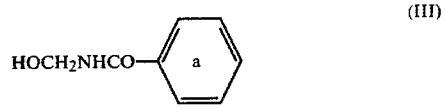

wherein the symbol a has the meaning defined in the foregoing. The reaction is performed according to Tscherniak-Einhorn in an acid medium, preferably in concentrated sulfuric acid, at room temperature.

The compounds of the formulae II and III are known. In the case of compounds of the formula III, they are for example N-methylolbenzamide, N-methyl-2,4-dichlorobenzamide, N-methylol-2-chlorobenzamide and N-methylol-4-chlorobenzamide.

The new anthraquinone compounds of the formula I are used as dyes for dyeing and printing materials dyeable with acid dyes, particularly textile materials made from synthetic polyamide, such as nylon or wool.

The new anthraquinone compounds of the formula I have good substantivity on polyamide materials. The dyeings obtained are distinguished by good fastness properties, particularly by good wet fastness properties, for example fastness to perspiration, and by good fastness to light.

The invention relates also to dye mixtures which, in the form of the free acid, correspond to the formulae I and IV

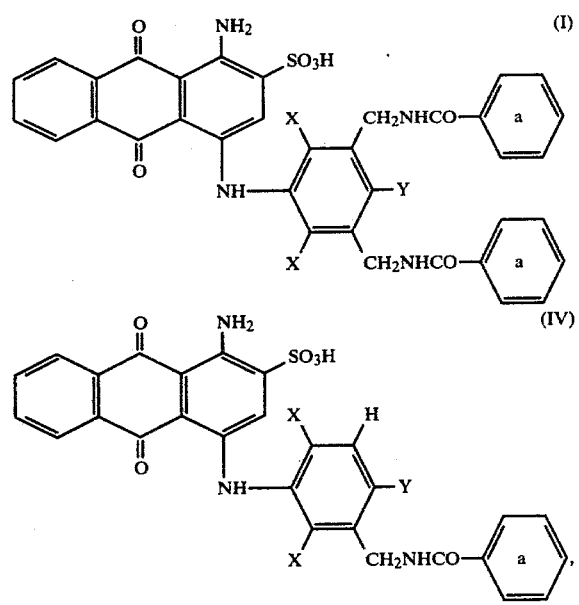

wherein X and Y have the meanings defined, and to solutions thereof in a solvent mixture consisting of one or more aprotic solvents, at least one glycol and/or glycol ether, optionally water and further additives.

Suitable aprotic solvents are for example the following compounds, or mixtures thereof, which are liquid at room temperature: nitrogen-containing compounds, such as N,N,N',N'-tetramethylurea, N-methylpyrrolidone and 1,5-dimethylpyrrolidone; sulfur-containing compounds, such as sulfolane (tetramethylenesulfone) and sulfolene (2,3- or 2,5-dihydrothiophene-S-dioxide) and derivatives thereof which are substituted in the α- and/or β-position, especially by alkyl or hydroxyalkyl groups, and dimethylsulfoxide; and also phosphorus-containing compounds, such as hexamethylphosphoric acid triamide, dimethylmethanephosphonate and bis-(dimethylamido)-methanephosphate.

Among the aprotic solvents mentioned, dimethylsulfoxide, N-methylpyrrolidone, tetramethylurea and dimethylmethanephosphonate, or mixtures of these solvents, are preferably used.

Suitable glycols or glycol ethers are for example: ethylene glycol, 1,2-propylene glycol, diethylene glycol, triethylene glycol and tetraethylene glycol, 2-methylpentanediol-3,4, ethylene glycol monomethyl, monoethyl or mono-n-butyl ether, diethylene glycol monomethyl, -ethyl or -butyl ether, diethylene glycol monoethyl ether acetate, triethylene glycol monobutyl ether, dipropylene glycol, glycerol, glycerol-1,3-diethyl ether or thiodiglycol.

Among the glycols or glycol ethers stated, those preferably used are: ethylene glycol, diethylene glycol, triethylene glycol, tetraethylene glycol, ethylene glycol monomethyl ether, ethylene glycol monoethyl ether, diethylene glycol monomethyl ether, diethylene glycol monoethyl ether and diethylene glycol mono-n-butyl ether, or mixtures of these glycols and glycol ethers.

Solvent mixtures which are particularly preferred are: N-methylpyrrolidone/diethylene glycol monomethyl ether; tetramethylurea/diethylene glycol monomethyl ether; N-methylpyrrolidone/tetraethylene glycol, tetramethylurea/diethylene glycol monobutyl ether, dimethylmethanephosphonate/diethylene glycol monobutyl ether and dimethylsulfoxide/diethylene glycol monobutyl ether.

The dye solutions according to the invention can also contain soluble additives, such as urea, pentaerythritol, antifoaming agents, dispersing agents, etc.

The anthraquinone compounds of the formula IV are known from the German Pat. No. 1,189,669.

The dye solutions contain 20 to 40, particularly 25 to 35, percent by weight of the mixture of the anthraquinone dyes I and IV, 5 to 20, especially 8 to 12, percent by weight of one or more aprotic solvents, in particular tetramethylurea or dimethylmethanephosphonate, 45 to 70, especially 55 to 65, percent by weight of a glycol and/or glycol ether, particularly diethylene glycol monobutyl ether, and optionally 1 to 50 percent by weight of water, and also further additives.

In particularly interesting liquid formulations, the ratio of aprotic solvent to glycol and/or to glycol ether is about 1:6.

A preferred dye mixture is that wherein the mixture of the two anthraquinone dyes consists of 55 to 75, especially 60, percent by weight of the anthraquinone dye of the formula I and 25 to 45, particularly 40, percent by weight of the anthraquinone dye of the formula IV.

A particularly interesting dye mixture corresponds to the formulae Ia and IVa

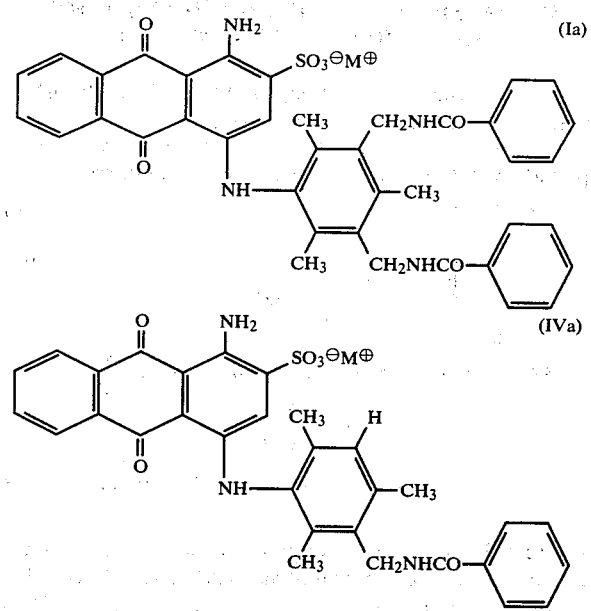

wherein $M^\oplus$ denotes Na, K, Li, NH$_4$, NH$_2$(C$_2$H$_4$OH), NH(C$_2$H$_4$OH)$_2$ or N(C$_2$H$_4$OH)$_3$.

The dye solutions according to the invention are obtained by dissolving the anthraquinone dye mixture as defined, preferably in dried powder form, in the solvent mixture mentioned, consisting of at least one aprotic solvent, a glycol and/or glycol ether and optionally water and additives, at a temperature of about 10° to 40° C., in particular at room temperature. The dissolving temperature and time depend on the solvent mixture employed; the data can be readily ascertained by preliminary tests.

A homogeneous dye solution is obtained if necessary by filtering off the insoluble constituents, for example inorganic salts, impurities, and so forth.

The dye solutions according to the invention are miscible with water in any proportion without precipitation of the dye occurring, and they can be easily measured out in controlled amounts by volume, irrespective of whether they are diluted with water or poured into water. The introduction of the dye solutions according to the invention into the liquor can be carried out at room temperature without danger of lumps being formed. These dye solutions are highly fluid, have a viscosity of about 100 cp/20° C. and are stable, both storage-stable and temperature-stable between −15° and +50° C.

The dye solutions according to the invention are suitable, after dilution with water and optionally after the addition of further auxiliaries, such as wetting agents, for example nonylphenol diglycol ether sulfate, for preparing dye solutions for dyeing or, by adding binders, for printing in particular natural or synthetic nitrogen-containing organic fibres, especially polyamide materials, such as wool. They can however also be used for other purposes, for example for producing lacquers, inks, and printing inks for recording instruments, ink pads and typewriter ribbons.

A preferred application of the dye solutions according to the invention is for dyeing leather, such as grained leather or suede leather.

For this purpose the solutions can be diluted with water alone, with water-miscible solvents alone, such as isopropanol, methanol, ethanol, ethylene glycol monoethylether or mixtures thereof, or together with proportions of water and with mixtures of water-soluble and water-insoluble solvents, such as fluorochemicals.

The application of the dye solutions to leather can be effected by any system of application, such as brushing, pouring or in particular by spraying and subsequent drying, for example by means of air-circulation.

Spray dyeing can be used particularly for natural leather of all types, for instance for correction of shade in the case of faulty dyeings, for levelling uneven bottom dyeings, for adjusting the shade, for increasing the brilliance of bottom dyeings, and for spraying over leather, which has already been treated, for obtaining special effects.

There is thus obtained dyed leather which has good fastness to light and to wet processing.

Analogous liquid formulations are known from the German Offenlegungsschrift No. 2,335,512; however, the liquid formulations containing a mixture of the stated anthraquinone compounds according to the invention are considerably more storage-stable and more temperature-stable than is a corresponding formulation containing the individual anthraquinone compounds separately.

The compound mixture which, in the form of the free acid, corresponds to the formulae I and IV is obtained according to the invention by reacting an anthraquinone compound which, in the form of the free acid, corresponds to the formula II

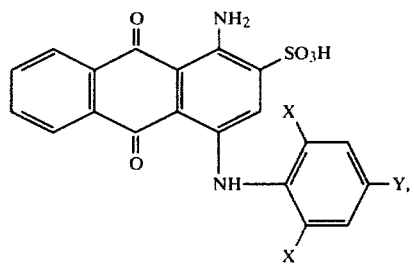

wherein X and Y have the meanings defined, with 1.1 to 1.9, preferably 1.6, equivalents of an N-methylolbenzamide of the formula III according to the known Tscherniak-Einhorn reaction.

Except where otherwise stated in the following Examples, which illustrate the invention but do not limit its scope, the term 'parts' signifies parts by weight, and the temperatures are given in degrees centigrade.

The anthraquinone compounds can be in the form of the free acid (SO$_3$H), or in the form of salt (for example Na, K, Li, NH$_4$, or mono-, di- or tri-ethanolamine salt).

EXAMPLE 1

13.8 parts of the sodium salt of the anthraquinone compound of the formula

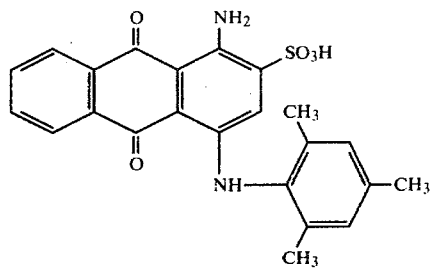

are dissolved at 10° to 15° in 150 parts of 96% sulfuric acid, and 10 parts (2.2 equivalents) of N-methylolbenzamide are added. The mixture is stirred for 24 hours at 20°; it is subsequently poured onto ice, and in the customary manner the resulting dye is separated as sodium salt. It corresponds to the formula

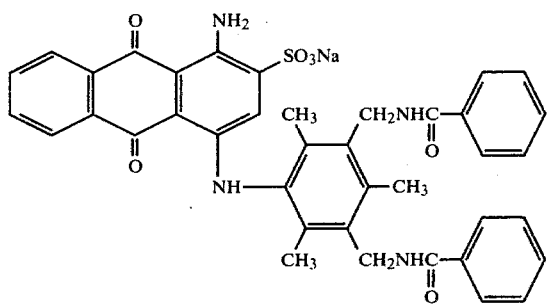

If this dye is applied from a weakly acid to neutral bath to synthetic polyamide fibres, a blue dyeing having good fastness to wet processing is obtained.

Dyes which dye polyamide fibres likewise in fast blue shades are obtained by using in the condensation reaction, instead of N-methylolbenzamide, 14.5 parts (2.2 equivalents) of N-methylol-2,4-dichlorobenzamide or 12.3 parts (2.2 equivalents) of N-methylol-2-chlorobenzamide or 12.3 parts (2.2 equivalents) of N-methylol-4-chlorobenzamide, with otherwise the same conditions.

EXAMPLE 2

A mixture of 13.8 parts of the sodium salt of the compound of the formula

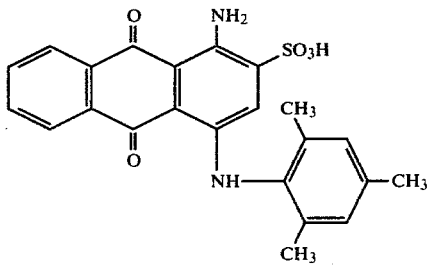

and 4.5 parts of N-methylolbenzamide is dissolved at 10° to 15° in 60 parts of 96% sulfuric acid. The mixture is stirred at 10° to 15° for 2 hours; 1.4 parts of N-methylolbenzamide are then added, and stirring is continued for one hour at 10° to 15°. An additional 1.3 parts of N-methylbenzamide (total 1.6 equivalents) are added, and the reaction solution is stirred at 20° for a further 6 hours. This solution is poured onto ice, in the course of which the reaction product precipitates and is subsequently filtered off.

The residue thus obtained is suspended in water, and is isolated as sodium salt in the customary manner. The result after drying is a bluish powder consisting of the following dye mixture:

about 40 percent by weight of the dye of the formula

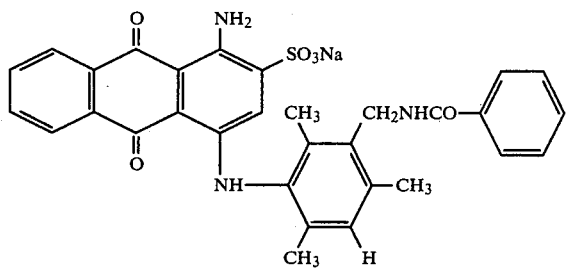

and about 60 percent by weight of the dye of the formula

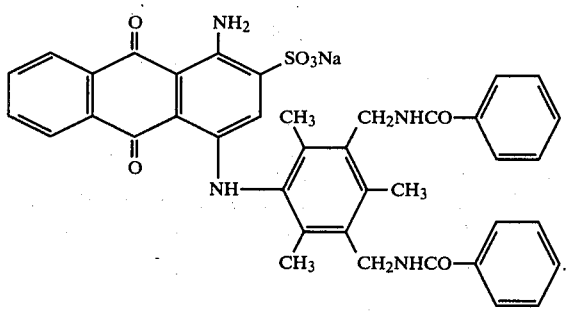

EXAMPLE 3

(a) Preparation of the solution 315 parts of the dried dye mixture of the formulae

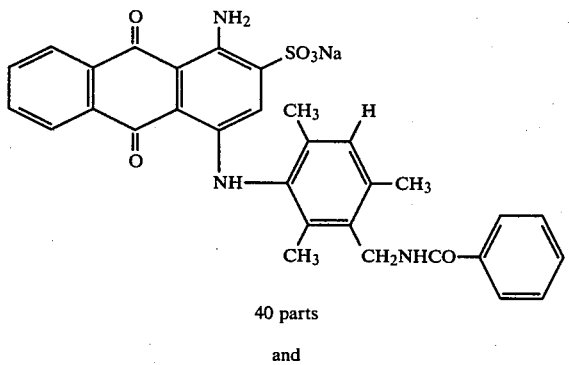

40 parts and

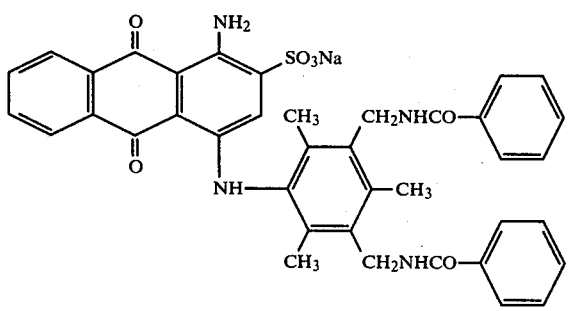

-continued
60 parts are introduced at 40° into a mixture of 100 parts of tetramethylurea and 585 parts of diethylene glycol monobutyl ether. The solution is stirred for one hour at 40°, and is then allowed to cool. The insoluble constituents (for example salts) are filtered off.

The resulting solution containing
31.5% by weight of crude dye mixture (colouring strength 316%) as sodium salt having the following composition:
  40% of monocondensate
  60% of dicondensate,
10.0% by weight of tetramethylurea, and
58.5% by weight of diethylene glycol monobutyl ether is highly fluid ($\sim$100 cps), storage-stable at $-15°$, $+20°$ and $+50°$ over several months, and miscible with water in any proportion. By using instead of 315 parts of the dye mixture only 288 parts, instead of 100 parts of tetramethylurea 104 parts, and instead of 585 parts of diethylene glycol monobutyl ether 608 parts, the procedure otherwise remaining the same, there is obtained a liquid formulation having equally good properties and application possibilities, which contains
28.8% by weight of crude dye mixture (colouring strength 320%) as sodium salt having the following composition:
  38% of monocondensate
  62% of dicondensate,
10.4% by weight of tetramethylurea, and
60.8% by weight of diethylene glycol monobutyl ether.

(b) Application of the dye solution to leather

There are taken 100 parts of the dye solution obtained according to (a), and these are diluted at room temperature with 100 parts of ethylene glycol and 800 parts of water. In this way are obtained 1000 parts of a spray solution which is stable at room temperature for about 3 days. This spray solution is sprayed onto suede leather (amount applied 60 to 100 g of spray solution per square meter), and subsequently dried. The result is a leather dyed in a blue shade which has good fastness properties.

EXAMPLE 4

276 parts of the sodium salt of the compound of the formula

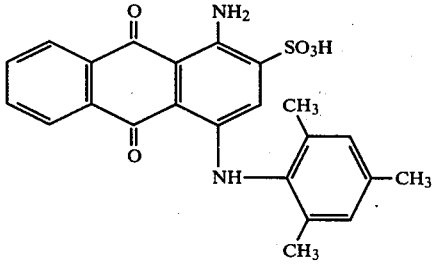

are condensed, in a manner analogous to that described in Example 2, with a total of 144 parts (1.6 equivalents) of N-methylolbenzamide. Stirring is continued at 20° until thin-layer chromatography indicates that no further starting material is present; the condensation mixture is then poured onto ice to precipitate the reaction product consisting of the following dye mixture: about 40 percent by weight of the dye of the formula

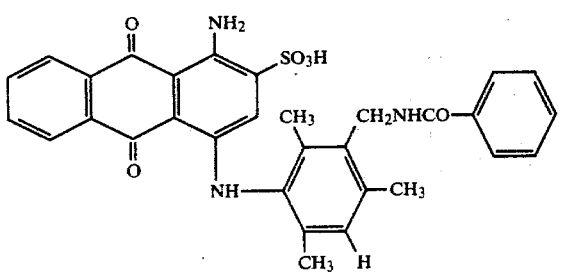

and about 60 percent by weight of the dye of the formula

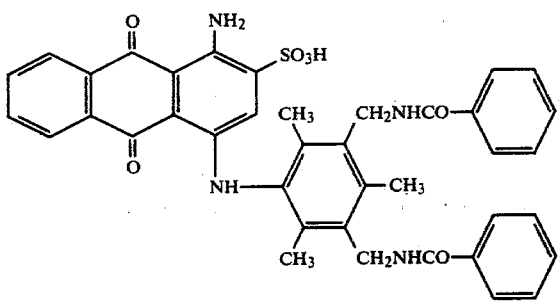

270 parts of this dried dye mixture (as free acid) are introduced at 40° into a mixture of 100 parts of dimethylmethanephosphonate and 600 parts of diethylene glycol monobutyl ether, and the mixture is rendered neutral with the addition of 30 parts of ethanolamine. The ethanolamine salt of the dye mixture is thus obtained.

The solution is stirred for one hour at 40°, and is then allowed to cool.

This solution, which contains

27% by weight of the crude dye mixture (colouring strength 345%) as free acid having the following composition:
40% of monocondensate
60% of dicondensate,
10% by weight of dimethylmethanephosphonate,
60% by weight of diethylene glycol monobutyl ether, and
3% by weight of ethanolamine, is highly fluid (~100 cps), storage-stable at −15° to +50° over several months, miscible with water in any proportion and is suitable, as described in Example 3 b, for dyeing leather.

EXAMPLE 5

260 parts of the dried dye mixture (as free acid) of the formulae

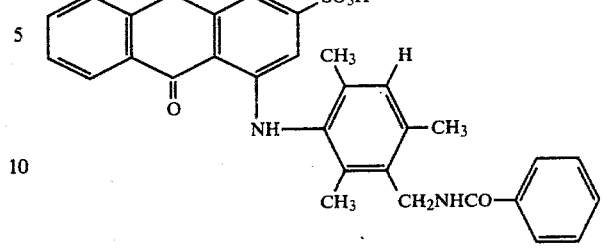

38 parts and

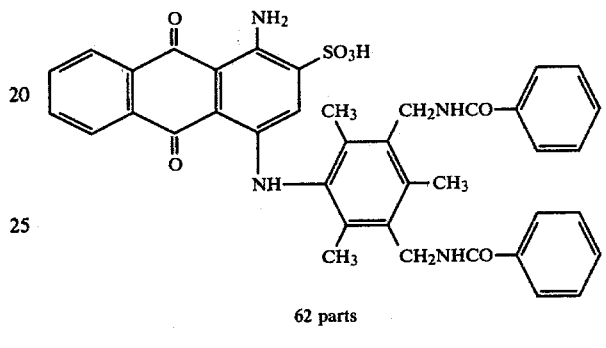

62 parts are introduced at 40° into a mixture of 100 parts of dimethylsulfoxide and 618 parts of diethylene glycol monobutyl ether, and the mixture is rendered neutral with the addition of 22 parts of ethanolamine. There is obtained in this manner the ethanolamine salt of the dye mixture. The solution is stirred for one hour at 40° and is then allowed to cool.

The resulting solution consisting of:
26.0% by weight of the crude dye mixture (colouring strength 350%) as free acid having the following composition:
38% of monocondensate
62% of dicondensate
10.0% by weight of dimethylsulfoxide,
61.8% by weight of diethylene glycol monobutyl ether, and
2.2% by weight of ethanolamine is highly fluid (60 cps), storage-stable at −15°, +20° and +50° over several months, and miscible with water in any proportion.

EXAMPLE 6

There is prepared a dye bath of 4000 parts of water, 4 parts of ammonium acetate, 2 parts of the dye according to Example 1, and acetic acid in an amount sufficient to being the pH value of the bath to 6.0. 100 parts of a synthetic polyamide tricot are introduced into the dye bath obtained; the bath is heated in the course of half an hour to boiling, and dyeing is performed at 100° for 45 minutes. A deeply coloured blue dyeing having good fastness to wet processing is obtained.

We claim:

1. A dye solution containing a solvent mixture of one or more aprotic solvents, at least one glycol and/or glycol ether and a dye mixture consisting of 55 to 75 percent by weight of the anthraquinone dyestuff, the free acid formula thereof being

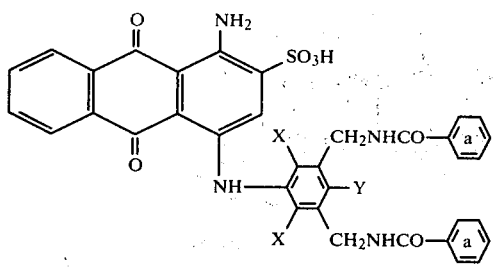

and of 45 to 25 percent by weight of the anthraquinone dyestuff, the free acid formula thereof being

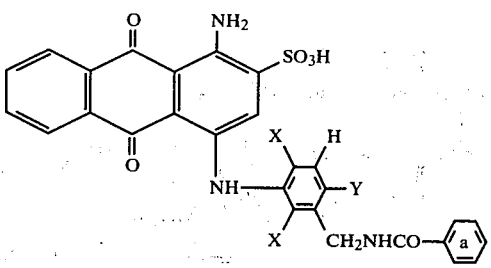

wherein the X's independently of one another are each a straight-chain or branched-chain alkyl group having 1 to 4 carbon atoms, Y is hydrogen or is the same as X, and wherein the rings are phenyl rings or halogen substituted phenyl rings.

2. A dye solution according to claim 1, which contains as aprotic solvents nitrogen-containing compounds selected from the group consisting of N,N,N',N'-tetramethylurea, N-methyl-pyrrolidone and 1,5-dimethylpyrrolidone; sulfur-containing compounds selected from the group consisting of dimethylsulfoxide, unsubstituted tetramethylenesulfone and 2,3- or 2,5-dihydrothiophene-S-dioxide and derivatives thereof substituted in the α- and/or β-position by alkyl or hydroxyalkyl groups or phosphorus-containing compounds selected from the group consisting of hexamethylphosphoric acid triamide, dimethyl-methanephosphonate and bis-(dimethylamido)-methanephosphate.

3. A dye solution according to claim 1, which contains as aprotic solvent dimethylsulfoxide, N-methylpyrrolidone, tetramethylurea, dimethylmethanephosphonate or mixtures thereof.

4. A dye solution according to claim 1, which contains glycols selected from the group consisting of ethylene glycol, diethylene glycol, triethylene glycol and tetraethylene glycol or glycol ethers selected from the group consisting of ethylene glycol monomethyl ether, and diethylene glycol monomethyl ether, diethylene glycol monoethyl ether, ethylene glycol monoethyl ether, and diethylene glycol mono-n-butyl ether, or mixtures thereof.

5. A dye solution according to claim 1, wherein the solvent mixture consists of
N-methylpyrrolidone/diethylene glycol monomethyl ether,
tetramethylurea/diethylene glycol monomethyl ether,
N-methylpyrrolidone/tetraethylene glycol,
tetramethylurea/diethylene glycol mono-n-butyl ether,
dimethylmethanephosphonate/diethylene glycol mono-n-butyl ether or
dimethylsulfoxide/diethylene glycol mono-n-butyl ether.

6. A dye solution according to claim 1, which further contains water and/or additives selected from the group consisting of urea, pentaerythritol, antifoaming agents and dispersing agents.

7. A dye solution according to claim 1, which contains
20 to 40 percent by weight of the mixture of the anthraquinone dyestuffs,
5 to 20 percent by weight of one or more aprotic solvents,
45 to 70 percent by weight of a glycol and/or of a glycol ether and
0 to 50 percent by weight of water.

8. A dye solution according to claim 3, which contains
25 to 35 percent by weight of the mixture of the anthraquinone dyestuffs in the mixture ratio of 60 percent by weight of the dye of the formula

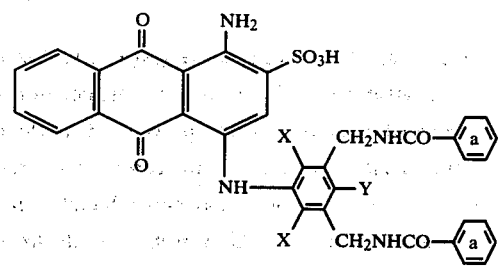

and 40 percent by weight of the dye of the formula

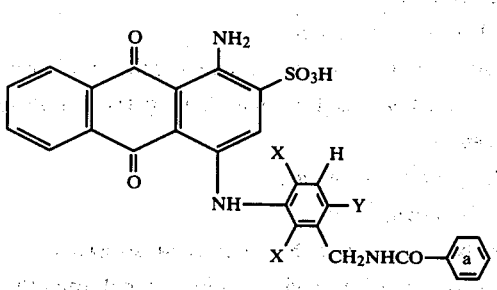

8 to 12 percent by weight of at least one aprotic solvent selected from the group consisting of tetramethylurea and dimethylmethanephosphonate, and
55 to 65 percent by weight of diethylene glycol mono-n-butyl ether.

9. A dye solution containing a solvent mixture of one or more aprotic solvents, at least one glycol and/or glycol ether and a dye mixture consisting of 55 to 75 percent by weight of the anthraquinone dyestuff of the formula

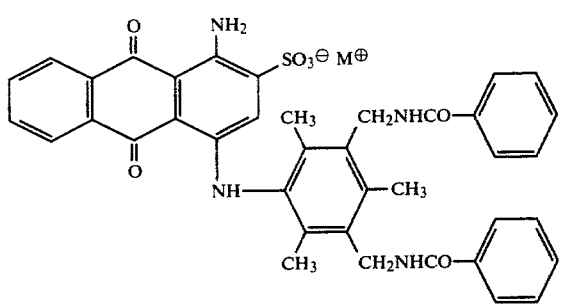

and of 45 to 25 percent by weight of the anthraquinone dyestuff of the formula

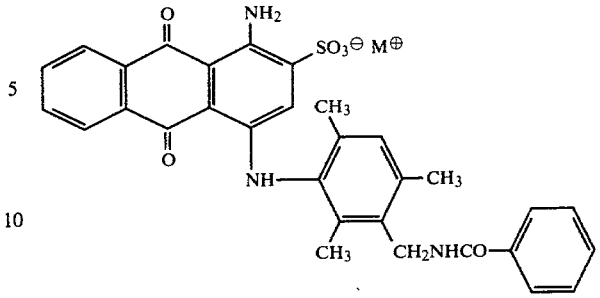

wherein $M^\oplus$ is Na, K, Li, $NH_4$, $NH_2(C_2H_4OH)$, $NH(C_2H_4OH)_2$ or $N(C_2H_4OH)_3$.

10. A process for the manufacture of dye solutions according to claim 1, in which the dye mixture of the two anthraquinone dyestuffs of the indicated formulae is dissolved in a solvent mixture of one or more aprotic solvent and at least one glycol and/or glycol ether at a temperature of 10° to 40° C.

11. A method of dyeing textile materials or leather comprising the steps of diluting the dye solution according to claim 1 with water and/or an organic solvent and of applying the obtained diluted aqueous organic or organic-aqueous dye bath to textile materials of nitrogen-containing organic fibers or to leather.

12. Method according to claim 11, in which the dye bath is applied to wool or polyamide materials or to leather.

13. Method according to claim 11, in which the dye bath is applied to leather by spraying.

* * * * *